United States Patent [19]
Morton

[11] 3,827,560
[45] Aug. 6, 1974

[54] AQUARIUM FILTER

[76] Inventor: Michael S. J. Morton, 11860 14th South, Seattle, Wash. 98168

[22] Filed: June 21, 1971

[21] Appl. No.: 155,132

[52] U.S. Cl. ............................................. 210/169
[51] Int. Cl. .............................................. E04h 3/20
[58] Field of Search ...................... 210/169, 79–81, 210/106, 194, 196, 197

[56] References Cited
UNITED STATES PATENTS

| | | | |
|---|---|---|---|
| 3,472,381 | 10/1969 | Halpert | 210/169 |
| 3,490,416 | 1/1970 | Kelley et al. | 210/169 X |
| 3,516,544 | 6/1970 | Sesholtz | 210/169 |
| 3,529,574 | 9/1970 | Kelley | 210/169 X |
| 3,578,169 | 5/1971 | White | 210/169 |

*Primary Examiner*—Theodore A. Granger
*Attorney, Agent, or Firm*—Graybeal, Barnard, Uhlir & Hughes

[57] ABSTRACT

A filter for placement on the bottom of an aquarium tank and adapted to underlie a layer of filtering material such as sand or gravel, including in one form, a plurality of walled chambers adjacent an aeration compartment, each of the chambers including a perforated top surface and the aeration compartment including an air inflow tube, an air and water outflow tube and ports communicating with each of the walled chambers. The aeration compartment additionally includes means for segregating the flow of water from an individual walled chamber through the aeration compartment and out the air and water outflow tube such that application of a partial vacuum to the outflow tube causes an increased flow of water through the filtering material above, and the top perforations of the individual walled chamber to flush settled mulm or the like both out of the walled chamber and out of the filtering materials.

The method of cleaning a filter underlying a layer of filtering material such as sand or gravel on the bottom of an aquarium, including the steps of connecting partial vacuum generating means to the aerator discharge tube, turning off the flow of air into the aeration compartment and segregating individual walled chambers such that the flow of water through the sand or gravel above, and through the top perforations of the segregated walled chamber is increased to flush the mulm into the aeration compartment and out the outflow tube thereof.

11 Claims, 4 Drawing Figures

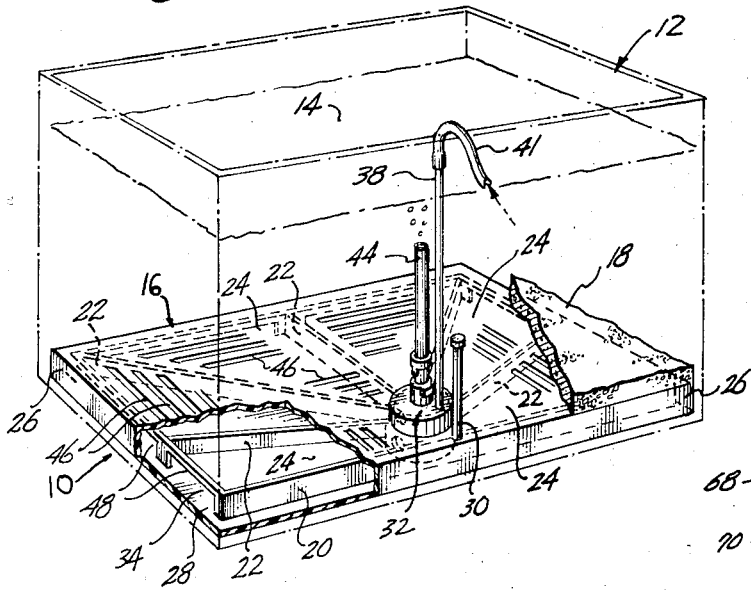
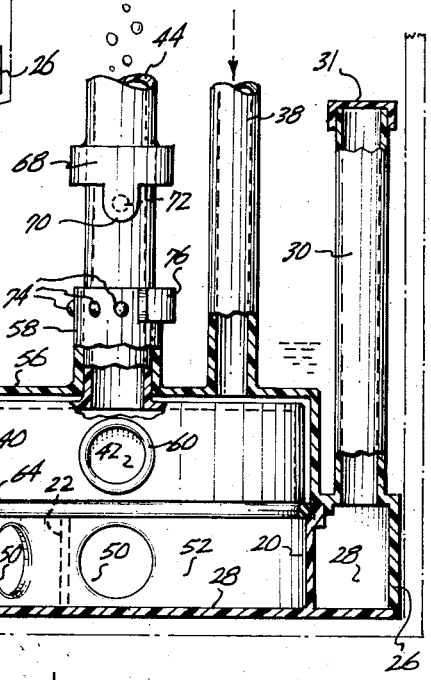
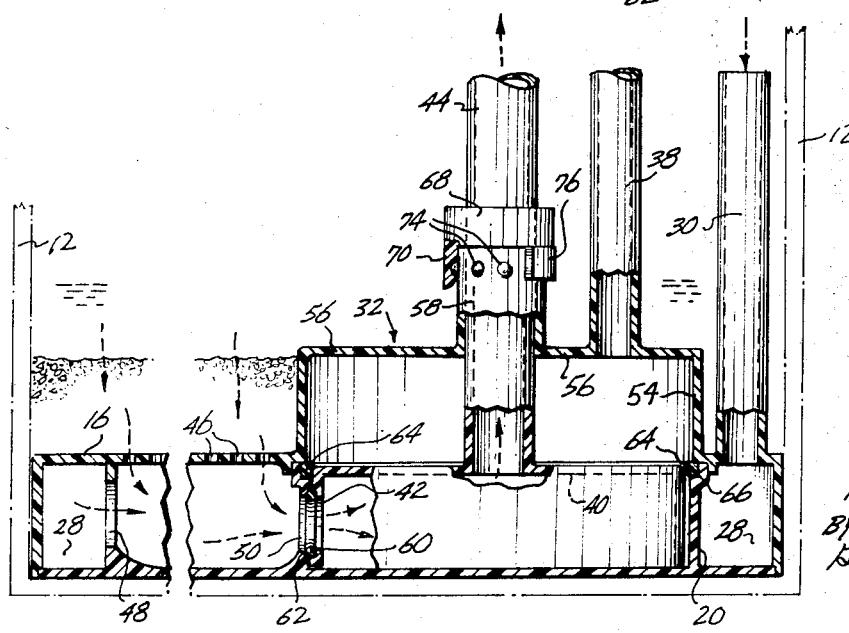
Fig. 1.
Fig. 2.
Fig. 3.
INVENTOR
MICHAEL S. J. MORTON
BY
Graybeal, Cole & Barnard
ATTORNEYS

AQUARIUM FILTER

BACKGROUND OF THE INVENTION

1. Field of the Invention

This invention relates to aquarium filters, and in particular to filters underlying a layer of filtering material such as sand or gravel on the bottom of the aquarium, and additionally to a method of cleaning filters of the above type without disrupting the aquarium environment.

2. Description of the Prior Art

As is well known, the water of an aquarium, whether it be fresh or salt water, must be maintained relatively free of organic waste and rich in oxygen in order to ensure the survival and health of the aquatic life contained therein. To maintain desired water conditions, filters and aerators of various types have been developed, one example being the common box filter in which air and water are bubbled through charcoal and glass wool purifying materials disposed therewithin. Girard, U.S. Pat. No. 3,247,826, discloses a box filter used in conjunction with water intake nozzles spaced about the bottom of the tank above the gravel base.

Generally more satisfactory purification and aeration of an aquarium environment may be obtained through the use of so-called sub-sand filters of the type generally disclosed in Hayden U.S. Pat. No. 2,871,820, Kelley et al. U.S. Pat. No. 3,490,416 or Sesholtz U.S. Pat. No. 3,516,544. Filters of this type generally include a chamber having a perforated top portion disposed on the bottom of an aquarium to support a layer of filtration material such as sand or gravel. An air intake tube and an air and water discharge tube are generally associated with the buried chamber such that the upward movement of the air in the discharge tube produces a partial vacuum in the chamber which causes water to be drawn down through and thus purified by the filtering material, through the top perforations of the filter chamber and thence up through the outlet pipe, all in a manner known to those skilled in the art.

During operation of known filters, mulm, the organic sediment that accumulates in an aquarium, is deposited in the filtration material and in the buried chamber of the filter. After a time, which may be short or long depending on the balance of the aquarium, the filter chamber reaches a point at which the collected mulm begins to be recycled into the tank where it becomes suspended in the water. This suspended mulm is both unsightly and potentially harmful to the inhabitants of the tank. To rebalance the aquarium, the filter including the sand or gravel filtering material resting thereon, must be removed from the aquarium and cleaned. To the aquarist this means several hours of rather disagreeable work, periodic disruption of the tank both environmentally and aesthetically and danger to both the plant and animal inhabitants thereof.

Other means such as syphons are also known and used for cleaning the aquarium filtering material of sub-sand filters but such suction type cleaners cannot be used successfully to clean the mulm from within the submerged filter chamber without seriously disturbing the aquarium and endangering the inhabitants thereof.

BRIEF DESCRIPTION OF THE INVENTION

The instant invention relates to a sub-sand filter of unique construction which may be easily cleaned without being removed from the aquarium tank, and thus, without disturbing either the plant or animal inhabitants of the tank. In one form, the present invention comprises a filter positioned on the bottom of an aquarium tank, including a plurality of walls defining adjacent walled chambers and a perforated top sheet covering said chambers and supporting filtration material such as sand or gravel. An aeration compartment is additionally provided having a port communicating with each of the adjacent walled chambers and additionally including an air intake tube and an air and water exhaust or "bubbling" tube through which the air pumped into the compartment exits. The air and water rising in the exhaust tube creates a partial vacuum which, in normal operation, draws water from the aquarium through the filtration material to purify it, and then draws the purified water into the filter chambers through the top perforations, through the aeration compartment and out the exhaust tube. In one form of the invention, a water conduit is additionally provided about the periphery of the filter chamber and includes a normally capped upstanding tube extending through the filtration material. During cleaning of the aquarium filter the cap is removed such that water is drawn by the partial vacuum directly into the conduit and thence through ports or openings into the walled chambers to increase the flow of water through the chambers thus increasing the flow of water through the filtering material thereabove. The aeration compartment additionally includes a gate adapted to close all but one of the ports of the aeration compartment such that the only water flow into and out of the aeration compartment is through the chamber isolated by the gate.

To clean the filter of the instant invention as well as the filtering material resting thereon, the flow of air into the aeration compartment used to produce the partial vacuum during normal filtering operation is turned off, vacuum or suction generating means such as a syphon is attached to the outflow tube of the aeration chamber, the peripheral water conduit intake tube is uncapped and the chamber segregating gate is lowered such that the only flow out the outflow tube of the aeration chamber is that entering through the portal communicating with the single chamber. The vacuum generating means substantially increases the flow of water down through the filtering material above the segregated chamber as well as the flow entering the chamber through the port communicating with the water conduit thereby flushing the deposited mulm from both the filtering material and the segregated chamber and out of the aquarium.

It is an object of the present invention, therefore, to provide a filter for aquarium use of the sub-sand type which may be cleaned without removing the filter from the aquarium.

Another object of the present invention is to provide a filter having a plurality of walled chambers communicating with an aeration compartment.

One more object is to provide a filter for aquarium use wherein the aeration compartment includes gate means for segregating one of the walled filter chambers for cleaning.

Still another object is to provide an aquarium filter having indexing means to aid in positioning the gate to segregate one of the walled compartments.

An additional object is to provide a filter for an aquarium which may be cleaned by the application of a suction to the air and water outflow tube of the aeration chamber.

Another object is to provide an aquarium filter of the sub-sand type having a peripheral water conduit feeding into the walled chambers to increase the flow therethrough into the aeration compartment during cleaning.

Still another object is to provide a filter of the sub-sand type whereby both the filter and the filter material supported thereon may be cleaned without removing them from the aquarium.

One more object of the present invention is to provide a method for cleaning an aquarium filter and associated filtration material without disrupting the aquarium environment.

Other objects and advantages of the present invention will be apparent from the following description taken in conjunction with the accompanying drawings.

BRIEF DESCRIPTION OF THE DRAWINGS

FIG. 1 is a perspective view of a typical filter of the present invention disposed on the bottom of an aquarium, including a portion of a layer of filtering material disposed on the perforated top surface thereof.

FIG. 2 is a partial side section view of the filter of the instant invention, including the filter chamber segregating gate of the aeration compartment in the up position during normal filtering operation.

FIG. 3 is a partial side sectional view similar to FIG. 2, but including the filter chamber segregating gate in the down position to segregate one chamber for cleaning.

DETAILED DESCRIPTION OF THE INVENTION

Figure 4:
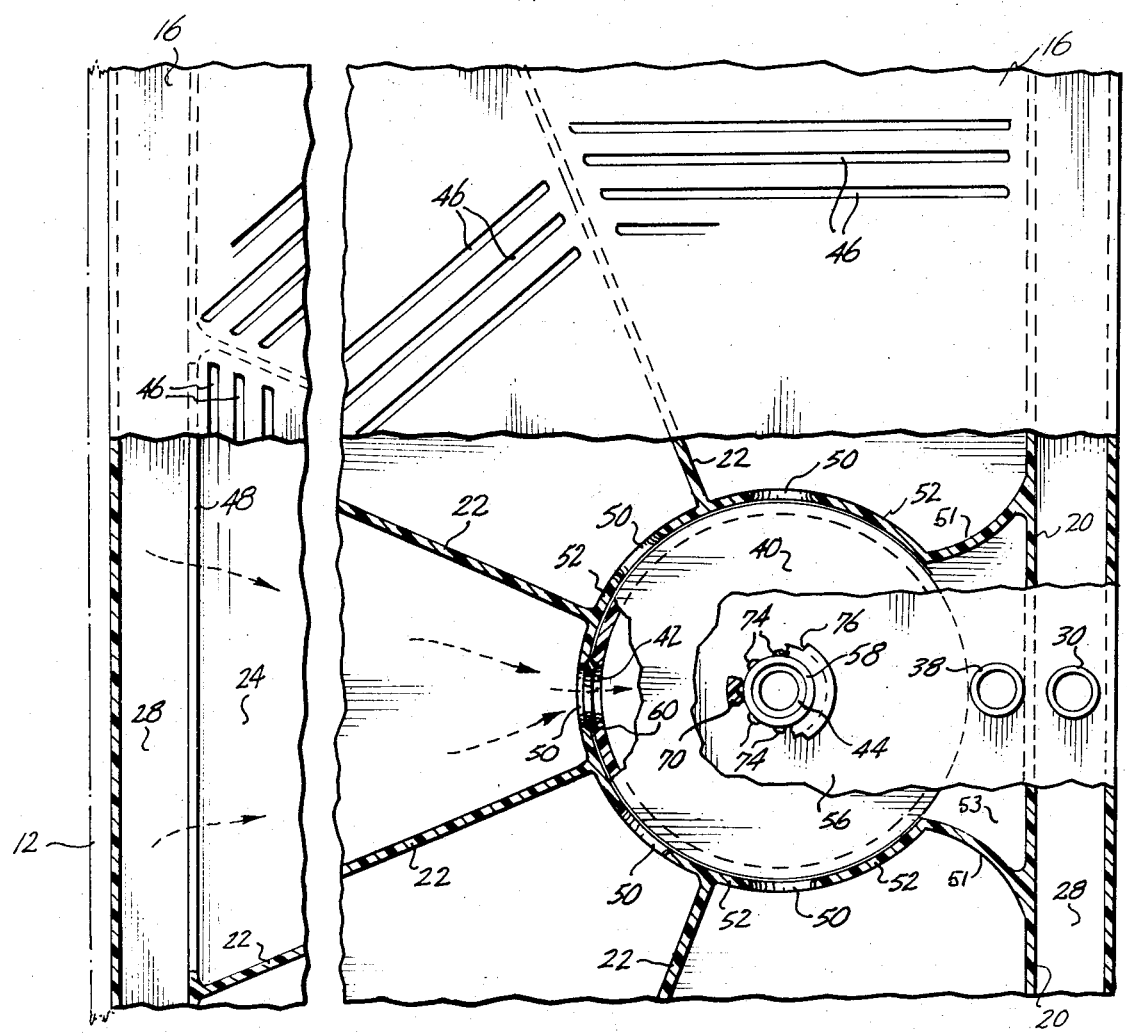
FIG. 4 is a partial sectional plan view of another typical embodiment of the aquarium of the present invention, including the air intake tube of the aeration compartment entering through the lower portion of the aeration compartment wall.

Referring initially to FIG. 1, an aquarium filter 10 constructed according to the teaching of the instant invention is shown positioned on the bottom of an aquarium 12 filled with either fresh or salt water 14. Aquarium filter 10 includes a slotted top surface 16 supporting a layer of sand, gravel or other conventional aquarium filtering material 18, it being understood that the size of the slots should be small enough to prevent the filtering material from passing into the filter chambers 24 below. Filter 10 additionally includes generally parallel circumferential walls 20 and 26 which define a conduit 28 through which water may flow directly from the aquarium through upstanding tube 30 during cleaning, and internal walls 22 which divide the filter into a plurality of adjacent chambers generally indicated by the numerals 24.

As disclosed, chambers 24 include side walls 22 radiating from an aeration compartment 32 which forms one end wall of the chambers while circumferential wall 20 having ports 48 therein forms the opposite end walls. It will be understood that other wall placements and configurations may be used in keeping with the principal features of the invention disclosed hereafter.

Referring additionally to FIGS. 2 and 3, aeration compartment 32 is more clearly disclosed to include air intake tube 38, extending upwardly from the top portion of the aeration compartment and air and water outflow tube 44 connected integrally to the generally cylindrical chamber segregating gate 40. Air intake tube 38 is connected by means of a rubber or plastic hose 41 (FIG. 1) to a conventional air pump (not illustrated) of the type commonly used in conjunction with aquariums.

In normal operation, air pumped downwardly through tube 38 enters the aeration compartment 32 above the chamber segregation gate 40, passes through port 42 into the aeration compartment and then bubbles up outflow tube 44 moving a column of water with it to create a partial vacuum within the aeration compartment. This partial vacuum draws water from the aquarium down through the filtration material 18 and into chambers 24 through slots 46 in the top surface of the filter. The filtered water is then drawn into the aeration compartment through ports 50 in the lower side wall 52 of the aeration compartment. A single port 50 is positioned between each of the chambers 24 and the adjacent aeration compartment, and as will be described hereafter is sized to register with the port 42 in segregation gate 40. Once in the aeration compartment, the water is continually circulated up outflow tube 44 by the rising air entering the compartment through tube 38.

Depending on the number and configuration of the chambers 24, slots 46 may be distributed on support surface 16 to produce a substantially uniform downflow pressure at all points on the filter material. This uniformly distributed downflow pressure allows substantially all of the filtration material to be used to purify the aquarium water thereby spreading the mulm and other refuse from the fish substantially equally over the filtering material and in chambers 24 therebelow.

Aeration compartment 32 includes generally cylindrical upper portion 54 having a circular top surface portion 56 through which air intake tube 38 and cylindrical collar 58 for air and water outflow tube 44 extend. FIG. 4 illustrates a modified aeration compartment including arcuate walls 51 extending between the compartment walls 52 and peripheral wall 20 to define a space 53 into which air input tube 38 feeds, thereby allowing the air to bubble directly up outflow tube 44 rather than following the circuitous path through opening 42 in the embodiments of FIGS. 1–3. While upstanding tubes 30, 38 and 44 are illustrated aligned one behind the other, it will be understood that the tubes are grouped primarily for aesthetic reasons and that other placements may be made without departing from the concept of the present invention.

As shown in the drawings, air outflow tube 44 is molded integrally with chamber segregating gate 40 to form a "plunger" shaped member mounted for rotation and vertical movement within cylindrical collar 58. Bead 60 surrounds circular port 42 on the side wall of gate 40 and extends outwardly therefrom for secure registration with the beveled edges 62 of a selected port 50 to form a substantially airtight seal. Aeration compartment 32 additionally includes an O-ring type gasket 64 mounted in notch 66 which acts both to hold gate 40 in the "up" position during normal operation of the filter and seal the lower portion of the aeration canister from the upper portion during cleaning.

As discussed above, after prolonged normal filtering operation, mulm tends to build up in the filtration material 18 and on the bottoms of chambers 24. The instant invention provides a method and apparatus for removing the mulm from the aquarium system without removing the filter from the aquarium or disturbing the filtration material or any plant life growing therein. To clean the filter, the air pump supplying air through intake tube 38 is turned off and tube 38 sealed, a vacuum pump, syphon or other suction producing or vacuum generating means is connected to outflow tube 44, cap 31 is removed from water conduit inflow tube 30 and the gate 40 is lowered until its bottom edge rests on the bottom of the aeration chamber. The plunger shaped gate and outflow tube member is then rotated to place port 42 in register with one of the ports 50 associated with a filter chamber 24. Bead 60 mates with the beveled edge 62 of the port 50 thereby sealing the gate such that the only water flow up through tube 44 is that passing through the selected chamber 24. It will be understood that while the movement of bead 60 into register with edge 62 might provide some tactile indication that the ports 42 and 50 were aligned, indexing collar 68 having a downwardly depending indexing finger 70 is fixedly mounted on outflow tube 44 to further assist the operator. Indexing finger 70 is radially aligned with port 42 and includes indent 72 which mates with outwardly extending nipples 74 mounted on collar 58 in radial alignment with each of the ports 50. Thus, rotation of tube 44 such that indent 72 is over one of the nipples 74 visually and tactilely informs the operator that the ports 42 and 50 are in register. Stop 76 is additionally provided on collar 58 to automatically inform the aquarist who begins cleaning the chamber associated with one or the other end nipples 74, and then moves to adjacent chambers, when he has completed cleaning all of the chambers 24.

Having segregated the flow from one of the chambers 24, the suction means connected to outflow tube 44 is activated to produce a suction within the chamber defined by lowered gate 40 and the bottom of the filter which draws water at a relatively rapid rate down through the filter material into the segregated chamber 24, through ports 50 and 42 and up the outflow tube 44. The rapid flow of the water loosens the deposited mulm from both chamber 24 and the filtering material resting thereabove, and flushes it from the aquarium for disposal. The flushing action in chamber 24 is additionally increased by water drawn by the suction through port 48 from the water conduit 28 communicating directly through tube 30 with the aquarium water. When the effluent from outflow tube 44 is substantially clear, tube 44 is rotated till indexing finger 72 grips the next adjacent nipple 74 to indicate the registration of port 42 and port 50 of the next adjacent chamber 24 and this chamber and the filtration material 18 resting thereon is cleaned in the manner described above. The cleaning and rotation process is continued until indexing finger 70 strikes stop means 76 indicating all of the chambers have been cleaned whereupon the suction means may be disconnected from outflow tube 44, inflow tube 38 unstopped, water conduit feed tube capped, gate 40 raised above O-ring 64 and the air pump again turned on for normal operation.

While a filter having a single aeration compartment located adjacent one edge of the aquarium near its center has been disclosed, it will be understood that filters of varying size or having multiple aeration compartments located at the corners of the filter, for example, are also contemplated. Additionally, more than one filter might be used in an aquarium at one time if needed.

While only six chambers 24 have been disclosed radiating from aeration compartment 32, it will be understood that a greater or lesser number of chambers may be provided to vary the flow characteristics of the water through the chambers during cleaning and depending upon the suction force to be applied to outflow tube 44.

FIGS. 2 and 3 disclose an additional embodiment wherein the bottom surface of the filter is sloped toward the aeration compartment to speed the flow of water theretoward as well as easing the loosening of the mulm from the bottoms of the chambers 24.

Further, it is contemplated that the disclosed filter will be formed of molded plastic employing known molding techniques, but other suitable materials or construction techniques may also be used and are considered to be within the scope of this invention.

While embodiments of the invention have been disclosed wherein a single chamber 24 is segregated from all of the other chambers during cleaning, it is considered within the scope of this invention to employ a stronger suction pressure to the outflow tube 44 to clean more than one chamber at one time by providing a greater number of ports 42 in gate 40 for registration with ports 50 of the chambers. It is considered, however, that thorough cleaning of the filtration material is best obtained by maximizing the downflow pressure through the filtration material such as by minimizing the area cleaned by a given suction pressure at one time.

The invention may be embodied in other specific forms without departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. An aquarium filter positionable beneath a filtration bed in an aquarium tank comprising:
   a perforated top surface panel supporting said filtration bed;
   wall panels extending downwardly from said perforated top surface panel to divide the area beneath said top surface panel into a plurality of chambers;
   an aeration compartment laterally adjacent said plurality of chambers and having common side walls with each of said chambers and like shaped openings in said side walls between said aeration compartment and each of said chambers;
   the aeration compartment including an air inflow tube and an air and water outflow tube extending upwardly therefrom a distance above said filtration bed; and
   gate means within said aeration compartment manually operable from a point above said filtration bed to selectively close all but one of said side wall openings between the aeration compartment and said chambers.

2. The aquarium filter of claim 1 wherein said aeration compartment is cylindrical in shape and extends a distance above said side wall openings, said compartment additionally having a closed top surface through which said air inflow tube and said air and water outflow tube extend.

3. The aquarium filter of claim 1 wherein said gate means is integrally connected with said air and water outflow tube, and wherein said air and water outflow tube extends upwardly from said aeration compartment such that movement of said air and water outflow tube correspondingly moves said gate means to selectively close all but one of said side wall openings.

4. The aquarium filter of claim 2 wherein said gate means is cylindrically shaped to fit relatively closely adjacent the side wall of said aeration compartment to close the side wall openings therein; said gate means including a single side opening selectively registrable with one of said side wall openings between the aeration compartment and said chambers.

5. The aquarium filter of claim 4 wherein said gate means is integrally connected with said air and water outflow tube extending upwardly from said aeration compartment, said gate means being both vertically movable and rotationally movable within said aeration compartment in response to like manual movement of said air and water outflow tube.

6. The aquarium filter of claim 1 including conduit means extending about the periphery of said filter and including port means in the side walls communicating with each of said chambers thereof, said port means being positioned at a distance spaced from said openings communicating with said aeration compartment; and, water supply tube means extending upwardly from said conduit through said filtration bed.

7. The aquarium filter of claim 1 including a bottom surface panel generally parallel said perforated top surface panel.

8. The aquarium filter of claim 7 wherein the bottom surface panel of said aquarium filter slopes downwardly toward said aeration compartment.

9. The aquarium filter of claim 3 wherein said air and water outflow tube extending upwardly from said aeration compartment includes indicating means positioned thereon above said filtration bed to assist in positioning said gate means in register with one of said side wall openings.

10. An aquarium filter for placement below a filtration bed in an aquarium tank comprising:
  a slotted top surface panel supporting said filtration bed;
  wall panels extending downwardly from said slotted top surface panel to form a plurality of chambers beneath said slotted top surface;
  an aeration compartment adjacent said plurality of chambers and in communication with each through substantially like sized opening means on the side walls of said aeration compartment;
  said aeration compartment additionally including an air inflow tube extending upwardly therefrom and an air and water outflow tube extending upwardly therethrough from within said aeration compartment, said air and water outflow tube being movable vertically and rotationally with respect to said aeration compartment;
  gate means within said aeration compartment integrally connected to said air and water outflow tube and having a single opening means registrable with one of said opening means on the side walls of said aeration compartment, said gate means being movable in response to movement of said air and water outflow tube from a first position wherein all of said side wall openings of said aeration compartment are open and a second position wherein all but one of said openings are closed; and,
  water conduit means in communication with all of said chambers said conduit having a water inflow tube extending upwardly therefrom through said filtration bed, and said conduit having openings therealong communicating with each of said chambers.

11. The aquarium filter of claim 10 wherein said aeration compartment is cylindrical in shape and extends above said side wall openings, and wherein said gate means is also cylindrically shaped and sized to fit snugly against a portion of the side wall of said aeration compartment.

* * * * *